United States Patent [19]

Tomita

[11] Patent Number: 4,640,794

[45] Date of Patent: Feb. 3, 1987

[54] IMPULSE ROCKET PROPELLANT

[75] Inventor: Masao Tomita, Nagoya, Japan

[73] Assignee: Kinki Denki Co., Ltd., Nagoya, Japan

[21] Appl. No.: 526,631

[22] Filed: Aug. 26, 1983

[30] Foreign Application Priority Data

Apr. 4, 1983 [JP] Japan ................................ 58-59085

[51] Int. Cl.[4] ................................ C09K 3/00

[52] U.S. Cl. ................................ 252/194; 106/85; 252/1; 252/182

[58] Field of Search ................ 252/1, 182, 193, 194; 200/150 R, 149 A; 106/85

[56] References Cited

U.S. PATENT DOCUMENTS

| | | | |
|---|---|---|---|
| 2,270,603 | 1/1942 | Ridder | 252/194 |
| 3,056,686 | 10/1962 | Shannon | 106/85 |
| 3,597,249 | 8/1971 | Shannon | 106/85 |
| 3,726,829 | 4/1973 | Sayler | 102/290 |
| 3,854,986 | 12/1974 | Chralovsky et al. | 106/85 |
| 3,930,872 | 1/1976 | Toeniskoetter et al. | 106/85 |
| 3,958,582 | 5/1976 | Noda et al. | 106/85 |
| 4,001,126 | 1/1977 | Marion | 102/290 |
| 4,008,170 | 2/1977 | Allan | 252/194 |
| 4,122,059 | 10/1978 | Hansen | 106/85 |
| 4,123,392 | 10/1978 | Hall et al. | 252/478 |
| 4,202,712 | 5/1980 | Goddard | 149/22 |
| 4,224,491 | 9/1980 | Kroon | 200/150 R |
| 4,251,699 | 2/1981 | Wiltgen | 200/149 A |
| 4,271,341 | 6/1981 | Meyer | 200/148 A |
| 4,278,468 | 7/1981 | Selbe et al. | 106/111 |
| 4,302,259 | 11/1981 | Ward | 149/22 |
| 4,340,521 | 7/1982 | Duleuil | 106/109 |
| 4,386,979 | 6/1983 | Jackson | 149/21 |
| 4,417,925 | 11/1983 | Cherry | 106/85 |
| 4,552,070 | 11/1985 | Langer | 60/909 |

FOREIGN PATENT DOCUMENTS 3133787 3/1983 Fed. Rep. of Germany ...... 102/290

*Primary Examiner*—Edward A. Miller
*Attorney, Agent, or Firm*—Burton, Dorr & Carson

[57] ABSTRACT

An impulse rocket propellant is comprised of highly hydrated mineral salts such as boric acid hydrate $HBO_2.H_2O$ and a plaster forming agent comprising calcium oxide hydrate $CaO.H_2O$ and sodium sulfate hydrate $Na_2SO_4.10H_2O$, all of which are compounded and intimately commingled with a heat conducting inorganic fiber such as glass wool. When these compounds are allowed to dry, loaded into suitable rocket devices, and instantaneously heated, the water of hydration of the hydrated mineral salts instantaneously vaporizes into steam which can be used to propel the rocket. The resulting unhydrated mineral salts are entrained within the steam. Upon coming into contact with the atmosphere, the steam condenses into fine water droplets into which the entrained salts dissolve and ionize. Because of its high conductivity, the resulting electrolyte vapor trail left by such propellants is particularly useful as an electrical bridge through which lightning can be removed from sensitive objects and conveniently grounded.

8 Claims, No Drawings

IMPULSE ROCKET PROPELLANT

PRIOR ART

In some rocket applications, impulse type propellants are preferred. Impulse propellants are characterized by their ability to produce high rates of gas evolution without the use of oxidation/reduction reactions. Like the gases produced by oxidation/reduction reactions, the gases produced by impulse propellants can also be used to propel various rocket devices. Oxidation/reduction based rocket propellants generally fall within two broad groupings—deflagration type propellants and detonation type propellants. Slower oxidation occurs on deflagration propellant particle surfaces such that the combustion products tend to flow away from the unreacted propellant to produce a rocket affect. This form of propellant combustion is to be contrasted with that of faster burning propellants whose combustion characteristics are more suggestive of high explosives wherein the combustion products flow back toward the unreacted propellant to instantaneously produce extremely high pressures. However, the working environments of some rocket applications will not tolerate either the open flames associated with deflagration type propellants or the percussions associated with detonation type propellants. Furthermore, some rocket applications also require that the vapor trails themselves be capable of performing useful functions which are not easily achieved by the vapor trails left by most deflagration or detonation type propellants. For example, one application that requires the production of a vapor trail having utility in its own right is that of dynamic current interruptor rockets. Furthermore dynamic current interruptor rockets are often used in working environments which have low tolerances for both open flames and strong percussions.

In this particular application, small rockets are used to prevent lightning damage to electrical power insulators. When lightning strikes an electrical distribution system equipped with such interruptors, the interruptor rocket is fired by the current surge caused by the lightning. Ideally, the lightning will follow the vapor trail of the departing rocket over a trajectory which leads it away from the tower or insulators to a prescribed electrical grounding point. In effect, such rockets leave vapor trails through the atmosphere which are better conductors for the lightning than undisturbed atmosphere. Such dynamic current interruptor rockets must therefore be capable of simultaneously providing the proper rocket propulsion dynamics for leading the lightning away from the insulators being protected as well as a highly conductive vapor trail. If the rocket travels too slowly the lightning will remain on the power line and damage the insulators. On the other hand if the propellant fires too vigorously, a potentially damaging or dangerous explosion may result. Furthermore, explosions are not generally accompanied by the production of long vapor trails.

Therefore, in the absence of suitable propulsion type propellants, the dynamic current interruptor rocket manufacturer is largely concerned with finding propellants which simultaneously produce (1) acceptable levels of flame and/or percussion (2) electrically conductive vapor trails (3) suitable levels of power for the rocket dynamics associated with dynamic current interruptor applications and (4) instantaneous ignition. Obtaining all of these characteristics is an art requiring just the right "touch". That is to say, in order to increase or decrease a gas evolution quantity per unit of area of solid propellant, it is necessary to increase or decrease the burning rate of these types of propellants under some predetermined burning pressure. Some principles of propellant combustion are helpful in producing the correct touch. For example, the grain size of the propellant's oxidizing agent can be increased or decreased to control combustion rates. Another control technique is to vary the amounts of certain metal grains which control the calorific value of the combustion gases. In the final analysis however, the provision of the elusive right touch in these combustion type rockets is largely a matter of finding just the right chemical ingredients for the propellant, when one is given the particular application and the sensitivities of the particular working environment.

For example, the applicant have tried and/or considered many different deflagration and explosive type propellants for use in their dynamic current interruptor rockets. Most of the more obvious propellants have one or more drawbacks. For example potassium or sodium nitrate propellants tend to deteriorate quickly under damp field conditions. On the other hand many nitrocellulose compounds tend toward explosiveness under some field conditions. In response to some of these drawbacks, many boron containing compositions have been considered. For example, boron hydride salts, particularly the nonmetal salts of decahydrodecaboric acid such as those taught in the U.S. Pat. No. 4,202,712 have been suggested. Since these propellants contain only boron, nitrogen, carbon and hydrogen but no oxygen, they are capable of achieving high gas outputs with low molecular weight combustion products. These characteristics are desirable for many military rocket applications. However, they are not particularly useful to dynamic current interruptor rockets since their low molecular weight combustion product trails are not as good electrical conductors as vapor trails comprised of combustion products having higher molecular weights. Such combustion products often have higher electrical conductivities; but as a general rule, the applicant has found that vapor trails comprised of combustion products of oxidation/reduction reactions generally display low electrical conductivity characteristics. This suggests the use of vapor trails which are not the products of oxidation/reduction reactions.

SUMMARY OF THE INVENTION

Improved rocket propellants, especially well-suited for use in dynamic current interruptor rockets, are provided by compounds characterized by their ability to take water of hydration and hold it while the propellant is in a solid form. If this water of hydration can be quickly, i.e. instantaneously, vaporized the resulting steam can be used as an impulse propellant. Assuming a suitable heat source, an instantaneous heating of the water of hydration can be obtained by use of an inorganic fiber mesh imbedded within the solid propellant's body. Highly hydrated, highly oxidized mineral salts are particularly useful for the purposes of this invention. Compounds comprised of boric acid hydrate $HBO_2.H_2O$ and a plaster forming agent comprising calcium oxide hydrate $CaO.H_2O$ and sodium sulfate hydrate $Na_2SO_4.10H_2O$, all of which are compounded and intimately commingled with a heat conducting inorganic fiber such a glass wool are highly preferred for such impulse rocket propellant purposes.

Applicant purposely uses somewhat unconventional chemical terminology in describing many of the ingredients of these propellants to emphasize that the water of hydration conncept is important to the operation of these particular propellants. For example, sodium sulfate hydrate might be more commonly called sodium sulfate decahydrate or Glauber's salt.

In any event, such hydrates may be formed in a number of ways. For example, a mixture of borax ($Na_2B_4O_7.10H_2O$), slaked lime ($Ca(OH)_2$), Glauber's salt ($Na_2SO_4.10H_2O$), disodium phosphate dodecahydrate ($Na_2HPO_4.12H_2O$), and optionally aluminum oxide ($Al_2O_3$) can be mixed with enough water to form a wet paste around a matrix of an inorganic fiber such as a glass wool.

When such compounds are allowed to dry, loaded into dynamic current interruptor rockets, and instantaneously heated, the water of hydration of the hydrated ingredients instantaneously vaporizes to produce steam which can in turn be used to propel the rocket. The resulting salts of the formerly hydrated ingredients are entrained within the steam. Upon coming into contact with the atmosphere, the steam condenses into fine droplets into which the entrained salts dissolve and ionize. Because of its high conductivity, the rocket's electrolyte vapor trail is particularly useful as an electrical bridge through which lightning can be removed from sensitive objects and conveniently grounded. Such sensitive objects might include, but not be limited to, electrical equipment such as insulators, generators, towers and the like, buildings, and aircraft. Preferably the propellant is activated by a conducting wire which is embedded within the dried propellant. Dynamic current interruptor propellants are most conveniently activated by the reaction of the lightning itself. In any case, the electrical current is initially led into the body of the propellant by means of conducting wires. Thereupon the glass fibers embedded within the propellant pick up and conduct the heat caused by the current surge throughout the propellant body. This causes the water of hydration of the various hydrated ingredients to more or less instantaneously vaporize into steam which can be harnessed by known methods to propel the rocket. The ingredients of these rocket propellants can be compounded over a wide range of proportions to produce a range of desired characteristics. The easiest method for preparing the preferred propellant compound of this invention consists of making a paste of the boric acid hydrate and the plaster forming agents i.e., the calcium oxide hydrate and the sodium sulfate hydrate, and then adding the resulting paste to the inorganic fiber. The resulting paste is packed around a center rod and allowed to dry. After drying, the center rod is removed and replaced by an electrical conductor wire which leads the electrical current caused by the lightning to the propellant body. Preferably the wire is embedded substantially through the entire length of the propellant body to facilitate instantaneous activation.

Since the function of the inorganic fiber is to conduct heat caused by the incoming current surge throughout the propellant, its chemical composition is not particularly critical to the practice of this invention. Typically, such inorganic fibers will be made by heating such materials as limestone, dolomite, clay, boric acid, soda ash, and other minor ingredients in high temperature furnaces. Some of the more or less standardized fiber glass formulations which can used in the practice of this invention are shown in Table 1. For example, electrical grade glass fiber compositions are designated under column (E), insulating fibers are designated under (I), plastic reinforcing fibers under (A), high strength fibers under (S), and chemically resistant glasses are shown under column (C).

TABLE 1

TYPICAL FORMULATIONS FOR FIBER GLASSES

| Ingredient | E | I | A | S | C |
|---|---|---|---|---|---|
| $SiO_2$ (wt. %) | 54 | 63 | 73 | 64 | 65 |
| $Al_2O_3$ (wt. %) | 14 | 5 | 1 | 24 | 4 |
| MgO (wt. %) | 4 | 2 | 2 | 10 | 3 |
| CaO (wt. %) | 19 | 6 | 10 | — | 14 |
| $R_2O$ (wt. %) | 0.5 | 16 | 14 | — | 8 |

The applicant has benched tested and field tested the impulse rocket propellants of this invention using different proportions of the three major ingredients. The relative proportions of these ingredients are given in Table 2.

TABLE 2

| COMPOUND | A | B | C | D |
|---|---|---|---|---|
| BORIC ACID HYDRATE (WT. %) | 80 | 50 | 40 | 20 |
| CALCIUM OXIDE HYDRATE (WT. %) | 1-10 | 1-25 | 1-30 | 1-40 |
| SODIUM SULFATE HYDRATE (WT. %) | 1-10 | 1-25 | 1-30 | 1-40 |
| INORGANIC FIBER | 10 | 25 | 30 | 40 |

Examples A, B, C, and D of this table established the range of proportions for some typical hydrates. For example, table 2 shows that compounds of the propellant having boric acid hydrate concentrations as high as 80% by weight and as low as 20% by weight functioned as impulse propellants when used in rocket devices such as those taught in applicant's co-pending U.S. patent application, Ser. No. 526,633 which is herein incorporated by reference. However, propellants made from the higher concentrations of boric acid hydrate i.e., in the neighborhood of 80% by weight tend to more quickly deteriorate over time under field conditions. Applicant believe that those propellants having the higher concentration of boric acid hydrate tend to pick up excessive moisture from the atmosphere. Propellants with boric acid hydrate concentrations as low as 20% by weight also produced the desired impulse propellant action. However, boric acid hydrate concentrations as low as 20% tend to produce slower impulse reactions and hence weaker propulsive forces. Consequently, dynamic current interruptor rockets using this propellant composition did not always provide the rocket dynamics needed to successfully ground the lightning charge. Compounds having about 50% boric acid hydrate show better ignition and powerful impulse reactions. However, the most preferred proportion of boric acid hydrate is about 40% by weight. Similarly, the impulse propellant function was tested using various proportions of the plaster forming agents i.e., the calcium oxide hydrate and the sodium sulfate hydrate. Their relative proportions were tested to almost the exclusion of the other. The most preferred propellant compound contains about 30% by weight of the plaster forming agent which in turn is most preferably comprised of about equal parts of calcium oxide hydrate and sodium sulfate hydrate. The inorganic fiber concentration can likewise be varied from about 10 to about 40% by weight. The preferred proportion is about 30% and the preferred inorganic fiber is a glass wool such as those taught in Table 1 of this disclosure. The most preferred fibers are the electrical grade fibers found under column E.

The impulse propellant composition of this invention may also be used in conjunction with conventional additives or modifiers for propellants of this type. For example, various metal oxides can be used as ingredients to mark or identify the rocket. Applicants have found, for example, that aluminum oxide $Al_2O_3.3H_2O$ is a particularly useful additive. It can contribute water of hydration for the production of steam and, when the lightning grounds, the oxide can impart a glow or corona discharge to the vapor trail which can be seen at night and used to identify the location of lightning strikes.

The foregoing disclosure is merely demonstrative of the principles of this invention and is not to be interpreted in a limited sense. More specifically, the applicant does not wish to be limited to any particular highly hydrated oxidized mineral salt or be limited to the exact proportions of the hydrates used in the examples. Furthermore, the applicant does not wish to limit the teachings or claims of the patent application to any non-essential additives. Obvious modifications will occur to those skilled in the art in all of these areas.

Thus having disclosed my invention, I claim:

1. A composition useful for propelling an impulse rocket, which when rapidly heated by an electrical current gives off steam to propel an impulse rocket and to produce a trail of ionized salts consisting essentially of about 20 to about 80 wt. % boric acid hydrate, about 10 to about 40 wt. % plaster forming agent comprising about 5 to about 25 wt. % sodium sulfate hydrate, and from about 10 to about 40 wt. % inorganic fiber.

2. The impulse rocket propellant of claim 1 consisting essentially of from about 30 to about 50 wt. % boric acid hydrate, about 20 to about 30 wt. % plaster forming agent comprising about 10 to about 20 wt. % calcium oxide hydrate and about 20 to about 10 wt. % sodium sulfate hydrate, and from about 20 to about 30 wt. % inorganic fiber.

3. The impulse rocket propellant of claim 1 consisting essentially of about 40 wt. % boric acid hydrate, about 30 wt. % plaster forming agent comprising about 15 wt. % calcium oxide hydrate and about 15 wt. % sodium sulfate hydrate, and about 30 wt. % inorganic fiber.

4. The impulse rocket propellant of claim 1 which further consists essentially of a metal oxide.

5. The impulse propellant of claim 1 which further consists essentially of a hydrated metal oxide.

6. A composition useful for propelling a dynamic current interrupter rocket which when rapidly heated by an electrical current gives off steam to propel the dynamic current interrupter rocket and produce a trail of ionized salts, consisting essentially of from about 20 to about 80 wt. % boric acid hydrate, about 10 to about 40 wt. % plaster forming agent comprising about 5 to about 25 wt. % calcium oxide hydrate and about 25 to about 5 wt. % sodium sulfate hydrate and about 10 to about 40 wt. % inorganic fiber.

7. A composition useful for propelling a dynamic current interrupter rocket which when rapidly heated by an electrical current gives off steam to propel the dynamic current interrupter rocket and produce a trail of ionized salts, consisting essentially of about 40 wt. % boric acid hydrate, about 30 wt. % plaster forming agent comprised of about 15 wt. % calcium oxide hydrate and about 15 wt. % sodium sulfate hydrate, and about 30 wt. % glass wool.

8. A composition useful for propelling a dynamic current interrupter rocket, which when rapidly heated by an electrical current gives off steam to propel the dynamic current interrupter rocket and produce a trail of ionized salts, consisting essentially of from about 40 wt. % of boric acid hydrate, about 30 wt. % plaster forming agent comprising about 15 wt. % sodium sulfate hydrate, about 28 wt. % of glass wool and about 2% aluminum oxide hydrate.

* * * * *